W. H. MANSIR.
Gun-Cleaners.

No. 158,851. Patented Jan. 19, 1875.

Witnesses
S. W. Piper
L. N. Coleal

Wm. H. Mansir
by his attorney
R. H. Eddy

UNITED STATES PATENT OFFICE.

WILLIAM H. MANSIR, OF WAKEFIELD, MASSACHUSETTS.

IMPROVEMENT IN GUN-CLEANERS.

Specification forming part of Letters Patent No. 158,851, dated January 19, 1875; application filed December 19, 1874.

*To all whom it may concern:*

Be it known that I, WILLIAM H. MANSIR, of Wakefield, of the county of Middlesex, of the State of Massachusetts, have invented a new and useful Improvement in Gun-Cleaners; and do hereby declare the same to be fully described in the following specification, and represented in the accompanying drawings, of which—

Figure 1:
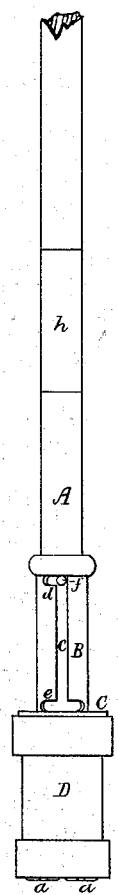
Figure 2:
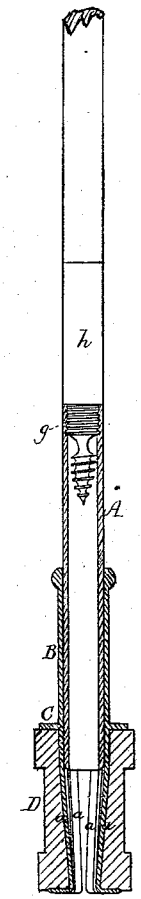
Figure 3:
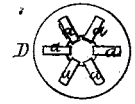

Figure 1 is a side view, Fig. 2 a longitudinal section, and Fig. 3 an end view, of one of my said cleaners.

It is designed to clean the bore of the barrel of a fire-arm, or the bore of a piece of ordnance.

In the said drawings, A is a shank, provided with a slide tube or sleeve, B, that encompasses it. The said tube has a head, C, fixed upon it at or near its middle. In advance of the said head the tube is slitted lengthwise with a number of slits, so as to form a series of prongs, *a a a*, to the tube. Encompassing these prongs is a vulcanized rubber wiper, D, formed as shown, it being held to them by contracting the prongs together, and bending each prong down near its end outward and over the outer end of the wiper, in manner as shown, the rear end of the wiper resting against the head C. In that part of the sleeve which projects beyond the wiper is a long slit, *c*, provided with lateral notches *d e*, opening out of it at right angles to it at its opposite ends. A stud, *f*, extends from the shank into the said slit. The shank at its upper end is provided with a female screw, *g*, to screw upon the end of a ramrod, *h*. Under ordinary circumstances the prongs of the sleeve will be bent or contracted toward each other by the elastic power of the wiper, but when the shank is forced down between the said prongs, it forces them apart and expands the wiper.

Prior to introducing the wiper into a gun barrel or bore, the shank is to be drawn back in the sleeve and turned, so as to carry the stud into the rear notch thereof. The wiper will then be in a contracted state, so as to be capable of being readily introduced into and down the bore to the bottom thereof. The wiper having thus been inserted in the bore, the shank should next be turned so as to carry the stud out of the said notch and into the slot, after which the shank should be forced downward and turned, so as to bring the stud into the other or lower notch, in which case the wiper will be expanded in the bore so as to fit it closely. On drawing back the shank or the ramrod connected with it, the wiper will be retracted through the bore and will cleanse it.

Gun-wipers as ordinarily constructed cleanse in going down as well as in being drawn back through the bore. They thus force the dirt or carbon down the bore to its bottom, and there pack it, and frequently press it into the touch-hole, but with my improved gun-cleaner, the wiper on being introduced into and down the bore, will be in a contracted state, so as not to remove any material part of the dirt or matter in the bore, which will be abstracted only after the wiper may have been expanded, and in this state may be in the act of being drawn back through the bore.

The great advantages of my improved gun-cleaner will be easily seen and appreciated by sportsmen and military men, as it may be made of a proper size for use with ordnance.

What I claim is—

The gun-cleaner, substantially as described, composed of the shank A and its stud *f*, the expansive wiper D, and the sleeve B slotted and provided with the notches, all being combined and arranged in manner, and to operate essentially as set forth.

WILLIAM H. MANSIR.

Witnesses:
R. H. EDDY,
J. R. SNOW.